(No Model.)
T. PORTER & G. W. GILLILAND.
EARTH AUGER.
No. 264,335. Patented Sept. 12, 1882.
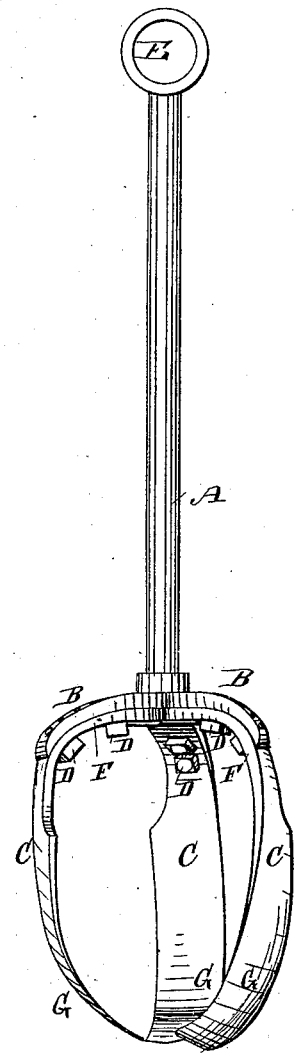
WITNESSES:
Theo. G. Hoster
C. Sedgwick
INVENTOR:
T. Porter
G. W. Gilliland
BY Munn & Co.
ATTORNEYS.

UNITED STATES PATENT OFFICE.

THOMAS PORTER AND GEORGE W. GILLILLAND, OF ABILENE, TEXAS.

EARTH-AUGER.

SPECIFICATION forming part of Letters Patent No. 264,335, dated September 12, 1882.

Application filed April 5, 1882. (No model.)

*To all whom it may concern:*

Be it known that we, THOMAS PORTER and GEORGE WASHINGTON GILLILLAND, both of Abilene, in the county of Taylor and State of Texas, have invented a new and Improved Earth-Auger, of which the following is full, clear, and exact description.

This improved auger consists of a shaft with short arms branching from the lower end radially and provided with springy blades, as hereinafter more fully described.

Reference is to be had to the accompanying drawing, in which the said improved boring-instrument is represented in side elevation.

A represents the shaft; B, the radial and curved arms at its lower end, and C the blades, attached to said arms by bolts D. The shaft has an eye, E, in the upper end for inserting a sweep by which to turn the auger or boring-instrument. The blades C have a shank, F, curved correspondingly with the curvature of the arms B, to fit to either the under or upper side of said arms. From the end of the arms, or thereabout, said blades extend downwardly for a suitable distance, and thence all curve inward at G near the point or toward the axis of the shaft, as clearly shown in the drawing.

With this improved implement a hole can be bored in ordinary soil in much less time than with the ordinary auger. It readily bores in ground in which the ordinary auger will not bore—viz., dry, hard, and packed soil, gravel, and concrete beds. No water is needed in boring dry soil. In ordinary soil it is self-feeding, and it only requires a little pressure to start it in hard soil. It requires but little power to turn it. In withdrawing the auger from the hole there is no suction. The earth which the blades cut loose is gathered within the blades, and then held, as in the grasp of a man's hand, for raising out of the hole. The earth is readily discharged after withdrawal from the hole by letting the instrument fall gently on the ground, only tapping the blades. The blades can be removed for grinding, and are adjustable for holes of different sizes, the shanks F of the blades and arms B having a series of holes for the bolts D.

When made of larger size the instrument can be used for boring wells, as it bores through anything except solid rock, and can be attached to and run by machinery.

The blades are made of either cast or wrought steel, and the head, including the arms B, in one piece of malleable iron. When adjusted for boring small holes the blades will be attached under the arms of the head; but for large holes they may be attached on the upper sides. The shaft is to be secured into the head.

Having thus fully described our invention, what we claim as new, and desire to secure by Letters Patent, is—

1. The combination, with the shaft A, having an eye, E, to receive a sweep, of the curved arms B and the blades C, provided with curved shanks to fit and be secured to said arms, either above or below, as shown and described.

2. The combination, with the shaft A and curved arms B, of the cutters C, having thin springy blades and shanks curved to fit said arms B, either above or below, as shown and described.

THOMAS PORTER.
GEORGE WASHINGTON GILLILLAND.

Witnesses:
ALBERT STEFFENS,
GEORGE A. KIRKLAND.